UNITED STATES PATENT OFFICE.

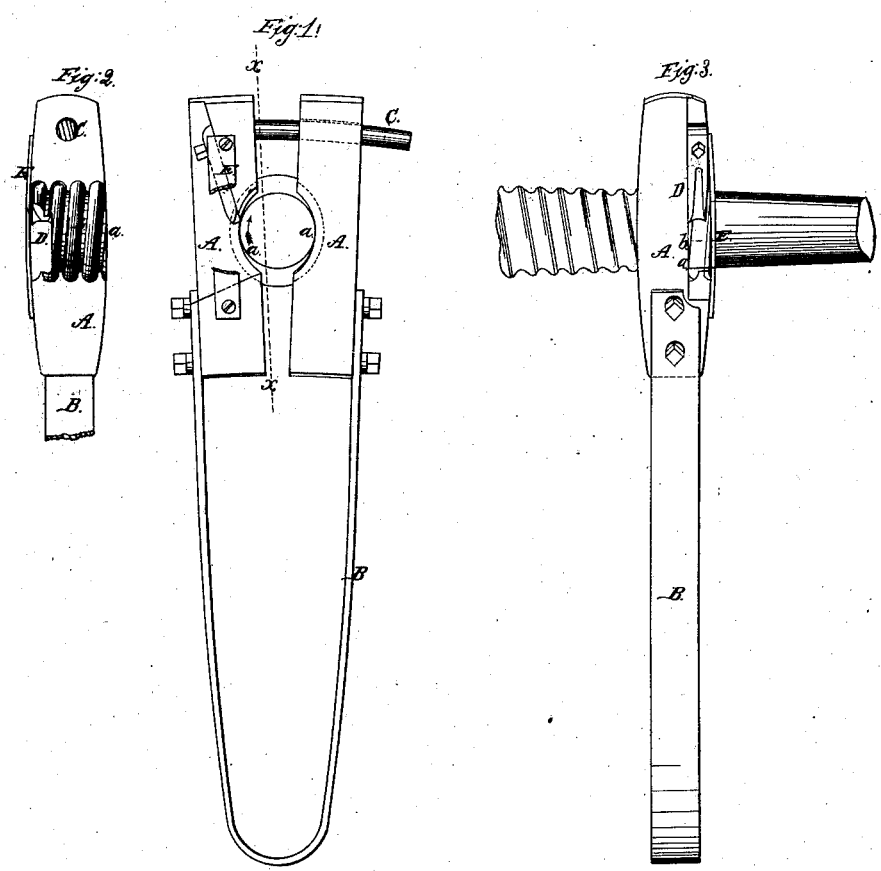

AMOS A. BURR, OF ROCKDALE, NEW YORK.

IMPROVEMENT IN TOOLS FOR TURNING-LATHES.

Specification forming part of Letters Patent No. 41,478, dated February 9, 1864.

*To all whom it may concern:*

Be it known that I, AMOS A. BURR, of Rockdale, in the county of Chenango and State of New York, have invented a new and useful tool for turning-lathes, the same being designed for cutting spiral beads on turned articles; and I do hereby declare that the following is a full, clear, and exact description of the same, reference being had to the accompanying drawings, making a part of this specification, in which—

Figure 1 is an external side view of my invention; Fig. 2, a section of the same, taken in the line *x x*, Fig. 1; Fig. 3, an edge view of the same.

Similar letters of reference indicate corresponding parts in the several figures.

This invention relates to a new and useful tool for cutting spiral beads on wooden articles, such as furniture-legs, &c., turned in a lathe and while being centered and rotated in the same.

The invention consists in the employment or use of two jaws attached either to an elastic bar or to shanks connected by a joint to admit of the jaws being opened and closed, said jaws having curved or semicircular recesses made in them, in which screw-threads are cut, and one of the jaws having a cutter and a guard attached to it, the above parts being used in connection with a spring and all arranged in such a manner that when the tool is applied to the work or article in the lathe and the article rotated the tool will feed itself along on the article and cut the spiral bead thereon.

To enable those skilled in the art to fully understand and construct my invention, I will proceed to describe it.

A A represent two jaws, which may be of quadrilateral or an approximate form in their transverse section and constructed of metal. Wrought-iron, steel, or malleable cast-iron would answer. These two bars are connected to the ends of an elastic plate, B, bent in U form, as shown clearly in Fig. 1. This plate B has a tendency to press the jaws A A together.

In the inner sides of the jaws A A there are curved or semicircular recesses *a*, one in each, and each recess has a screw, *b*, cut in it, as shown clearly in Fig. 2. These two recesses *a a* coincide with each other when the jaws A A are pressed together in contact, and they form a circular or elliptical opening.

One of the jaws A has attached to its inner side, near its outer end, a curved or segment rod, C, which passes through an opening in the other jaw. This rod C serves as a guide for the jaws, preventing the same from moving laterally out of a proper relative position with each other.

To one of the jaws A, at one side of it, there is attached a cutter, D, of gouge or other form, according to the shape of the bead to be cut. This cutter is placed in such a position that its edge is by the side of the recess *a*, as shown clearly in Fig. 1. To this same jaw A there is also attached at one side, near the cutter D, a plate, E, which serves as a guard or gage to prevent the cutter from penetrating or cutting too deep into the article being operated upon.

The operation is as follows: The article shown in red outline in Figs. 1 and 3, after being turned in the lathe of the desired form, has the tool applied to it, the jaws A A being distended or forced apart, so that they may grasp the article, the latter fitting in the recesses *a a*, so that the screws *b* will bear upon the article at one end of it. The article is then rotated, the tool being held by the hand of the operator. As the article rotates, the tool is fed along on the article by the screw-threads *b*, and the cutter D cuts the spiral bead, the guard or gage E preventing the cutter from penetrating too deeply into the article. The elastic plate B admits of the jaws A A yielding or giving to suit the inequalities of the article over which it passes.

This tool may be constructed at a very moderate cost, and will prove valuable to every wood-turning establishment where fancy or ornamental turning is done, as it will enable quite inexperienced persons to perform work hitherto required to be done by expert hands.

I would remark that instead of the elastic plate B rigid shanks may be used, connected by a joint, and a spiral spring placed upon the segment-rod C for the purpose of allowing the jaws to yield or give to the inequalities of surface over which they may pass. This modification, however, would be an equivalent of the construction first described and illustrated.

Having thus described my invention, what I claim as new, and desire to secure by Letters Patent, is—

The two yielding-jaws, A A, provided with recesses $a$ $a$, having screw-threads $b$ formed or cut on them, one of said jaws being provided with a cutter, D, and used either with or without the segment-rod C and guard or gage E, to form a new and useful tool for the purpose specified.

AMOS A. BURR.

Witnesses:
 THOS. S. J. DOUGLASS,
 D. ROBERTSON.